United States Patent
Drabe et al.

(10) Patent No.: US 7,059,189 B2
(45) Date of Patent: Jun. 13, 2006

(54) ACCELERATION SENSOR AND METHOD FOR DETECTING AN ACCELERATION

(75) Inventors: Christian Drabe, Sebnitzerstr (DE); Harald Schenk, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 11/239,556

(22) Filed: Sep. 29, 2005

(65) Prior Publication Data

US 2006/0048574 A1    Mar. 9, 2006

Related U.S. Application Data

(63) Continuation of application No. PCT/EP03/003400, filed on Apr. 1, 2003.

(51) Int. Cl.
*G01P 15/10* (2006.01)
(52) U.S. Cl. .................................. 73/514.29
(58) Field of Classification Search ............ 73/514.29
See application file for complete search history.

(56) References Cited

U.S. PATENT DOCUMENTS

| | | | |
|---|---|---|---|
| 2,928,668 A | | 3/1960 | Blasingame .................... 264/1 |
| 3,319,472 A | | 5/1967 | Reefman ...................... 73/517 |
| 4,345,482 A | | 8/1982 | Adolfsson et al. |
| 4,750,364 A | | 6/1988 | Kawamura et al. |
| 5,546,806 A | * | 8/1996 | Kain ........................ 73/514.31 |
| 5,824,903 A | * | 10/1998 | Nakamura et al. ........ 73/514.34 |

FOREIGN PATENT DOCUMENTS

| | | |
|---|---|---|
| DE | 2916103 | 10/1980 |
| GB | 2186085 | 8/1987 |
| WO | WO 00/75676 | 12/2000 |

* cited by examiner

*Primary Examiner*—Hezron Williams
(74) *Attorney, Agent, or Firm*—Thomas, Kayden, Horstemeyer & Risley, LLP

(57) ABSTRACT

An acceleration sensor comprises a mass, which can be deflected in a first direction and a second direction opposite to the first direction, a driver effective to vibrate the mass, a detector for detecting times when the mass passes a predetermined position when an acceleration is applied, and an evaluator which detects the acceleration based on the detected times during acceleration and times when the mass passes the predetermined position when no acceleration is applied. Thereby, it is achieved that the acceleration is detected inexpensively and accurately.

8 Claims, 8 Drawing Sheets

FIGURE 4
FIGURE 4A
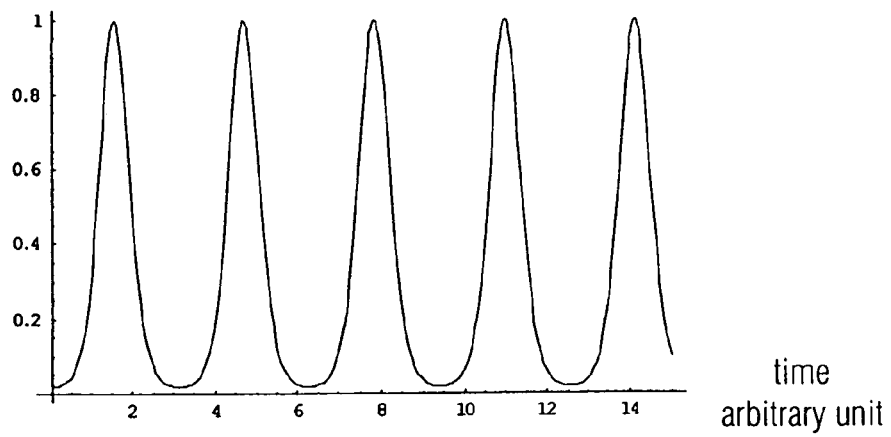
FIGURE 4B
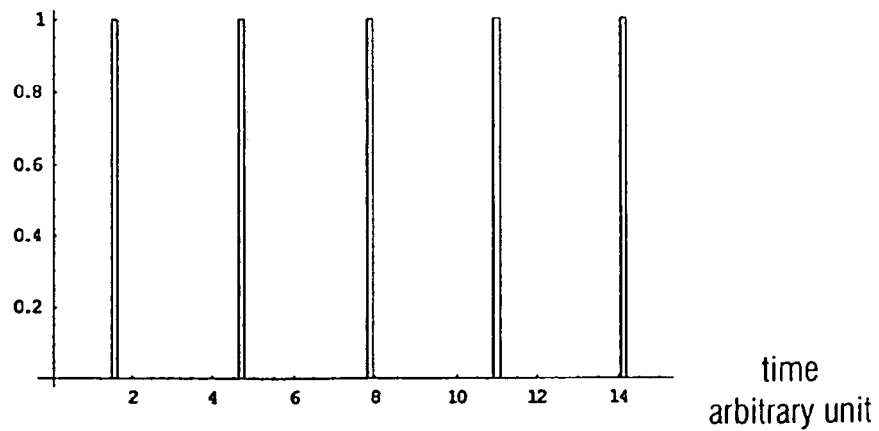

FIGURE 5
FIGURE 5A
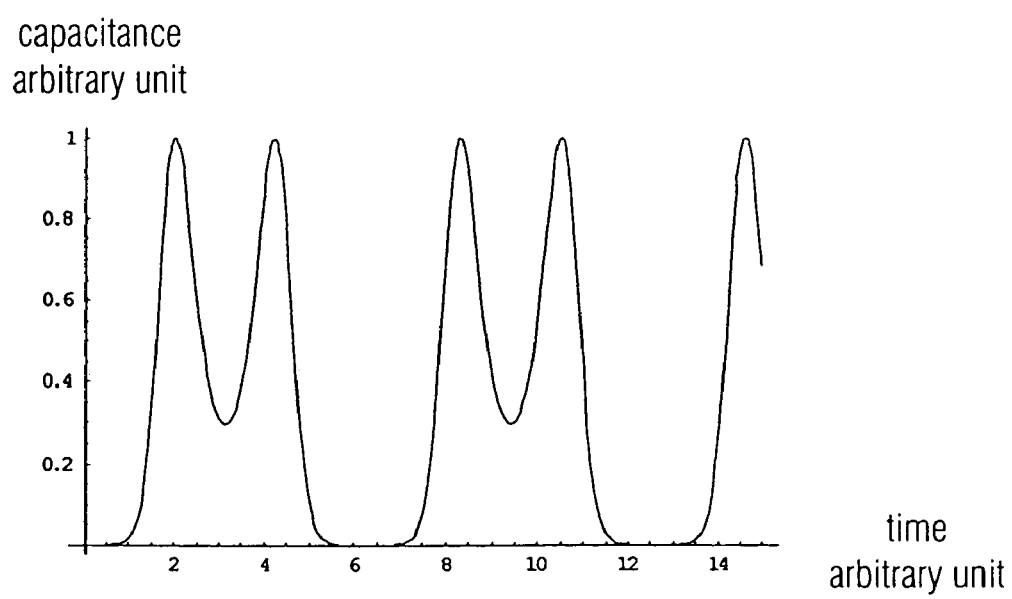
FIGURE 5B
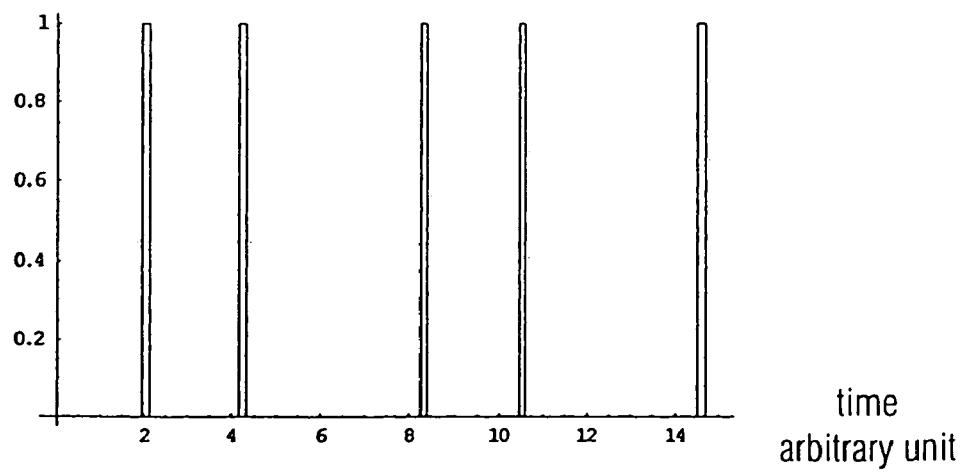

though no special acceleration points of reference are required for the same. Additionally, the principle works independent of constant magnitudes, such as gravitation. Further, no temperature compensation is required, whereby the read-out circuit is significantly simplified.

ACCELERATION SENSOR AND METHOD FOR DETECTING AN ACCELERATION

CROSS-REFERENCE TO RELATED APPLICATION

This application is a continuation of copending International Application No. PCT/EP2003/003400, filed Apr. 1st, 2003, which designated the United States and was not published in English.

BACKGROUND OF THE INVENTION

1. Field of the Invention

This invention relates to an acceleration sensor for detecting an acceleration of a system, wherein the acceleration sensor is also accelerated, and to a method for detecting an acceleration.

2. Description of the related art

For detecting an acceleration of a moving system, sensors (acceleration sensors) can be used, which are integrated in the moving system. Thereby, the acceleration sensors are also accelerated, so that normally no external points of reference can be used for detecting the acceleration. Thus, a central part of every acceleration sensor is an element changing one of its physical characteristics due to the external acceleration. If the acceleration sensor has, for example, a spring-mass system, a position of the mass suspended above the spring can be used for determining the acceleration in relation to a fixed point of the sensor. Additionally, there is also the possibility to utilize a change of electrical, magnetical or also optical characteristics of an element contained in the acceleration sensor when an external acceleration is applied, for determining the same.

Known technological solutions, which are based on the usage of a micromechanically produced spring-mass system, are, on the one hand, based on a detection of a deflection of a mass, which remains in a resting position by a mechanical restoring force of the spring when no external acceleration is applied, as described in the paper of S. Bütefisch et al.: "Three Axis Monolithic Silicon Low-g Accelerometer", J. Micromech. Systems, vol. 9, no. 4 (2000), pp. 551–556. When an acceleration is applied, the mass is deflected into a position which is given by an equilibrium of forces between spring restoring force and accelerating force. The acceleration is determined based on the deflection.

Apart from that, solutions exist where the accelerating force is compensated, for example, by an electrostatic force, such that the mass is substantially in its resting position, as it is described in the paper of N. Yazdi et al.: "An All-Silicon Single-Wafer Micro-g Accelerometer with a combined Surface and Bulk Micromachining Process", J. Micromech. Systems, vol. 9, no. 4 (2000), pp. 544–550, as well as in U.S. Pat. No. 5,540,095 by Sherman et al.: "Monolithic Accelerometer". In that case, the required compensation force represents a measure for the applied external acceleration.

In both cases, normally, the deflection caused by an external acceleration of a resiliently mounted seismic mass is determined such that a change of capacitance in connection with the deflection is determined via a differential capacitor means, or maintained at zero by electrostatical forces, respectively.

However, it is disadvantageous of the above-described approaches that they are susceptible to temperature variations as well as a possible drifting of the amplifier elements. Thus, a read-out circuit has to be switched such that such parasitic effects are compensated internally. This leads to an increased complexity of the read-out circuit as well as to possible measurement inaccuracies, which can have devastating consequences, particularly when using the acceleration sensors in the field of automobile safety technology. If acceleration sensors structured that way are, for example, used for vehicle stabilization, inclination measuring or also as airbag and impact sensors, respectively, possible measurement inaccuracies as well as the plurality of error sources always linked to the complexity of the read-out circuit, will cause, for example, vehicle malfunction in dangerous situations or also no release of the airbag.

SUMMARY OF THE INVENTION

It is an object of the present invention to provide a simple concept for accurately determining an acceleration.

In accordance with a first aspect, the present invention provides an acceleration sensor, comprising: a mass, which is deflectable in a first direction and a second direction opposite to the first direction; a driving means, which is effective to vibrate the mass; a detection means for detecting times when the mass passes a predetermined position when an acceleration is applied; an evaluation means, which detects the acceleration based on the detected times during acceleration and times when the mass passes the predetermined position when no acceleration is applied.

In accordance with a second aspect, the present invention provides a method for detecting an acceleration based on a vibrating mass, comprising the steps of: vibrating the mass; detecting times when the mass passes a predetermined position when an acceleration is applied; detecting the acceleration based on the detected times during acceleration and times when the mass passes the predetermined position when no acceleration is applied.

The present invention is based on the knowledge that an acceleration can be determined accurately based on a vibrating mass. If the mass is vibrated, wherein the vibration has a frequency as well as a phase with regard to a position (a fixed point within the system), the vibration does not change when no additional accelerating force acts on the mass. During acceleration, however, the mass is subject to an external force. In that case, the mass can preferably be detected when it passes a predetermined position. The predetermined position can, for example, be a resting position, wherein the mass remains without effect of an external force. If the mass is not accelerated, the vibration does not change, so that the mass passes the predetermined position at certain times. If an accelerating force acts on the mass, the times where the mass passes the predetermined position are different to times where the mass passes when no acceleration is applied. Thus, for determining the acceleration, a time difference can be determined between the times that can be determined by detecting the mass during passing the predetermined position during vibration when no acceleration is applied and the times determined by detecting the mass during passing the predetermined position when an acceleration is applied.

It is an advantage of the present invention that measuring an acceleration can be performed accurately, since according to the invention, a vibrating mass is used whose vibration is used as reference when no acceleration is applied. Thus, the acceleration is performed based on a vibration change, so that, for example, a previous accurate calibration of the acceleration sensor is not required.

It is another advantage of the present invention that the read-out circuit can be simplified, since the inventive acceleration sensor is, for example, not influenced by temperature variations and drifting of the amplifier elements, since for determining the acceleration no absolute quantity is used, but the change of time when the mass passes the predetermined position as a relative quantity.

It is a further advantage of the present invention that the acceleration sensor can simultaneously detect an acceleration as well as an acceleration direction, since the acceleration direction can, for example, be determined from a deflection of the mass in a direction to which a vector of the accelerating force points.

It is another advantage of the present invention that due to the vibrating mass, a plurality of methods for determining the acceleration can be used, such as capacitive path sensors, so that for producing an inventive acceleration sensor, a plurality of technologies are available, which make a production process more flexible.

It is another advantage of the present invention that the inventive acceleration sensor has a simple structure, whereby a number of possible error sources is reduced, so that the inventive acceleration sensor operates robustly, reliably and accurately.

BRIEF DESCRIPTION OF THE DRAWINGS

These and other objects and features of the present invention will become clear from the following description taken in conjunction with the accompanying drawings, in which:

FIG. 4 is a signal representing a vibration when no acceleration is applied;

FIG. 5 is a signal representing a vibration when an acceleration is applied;

DESCRIPTION OF THE PREFERRED EMBODIMENTS

Figure 1:
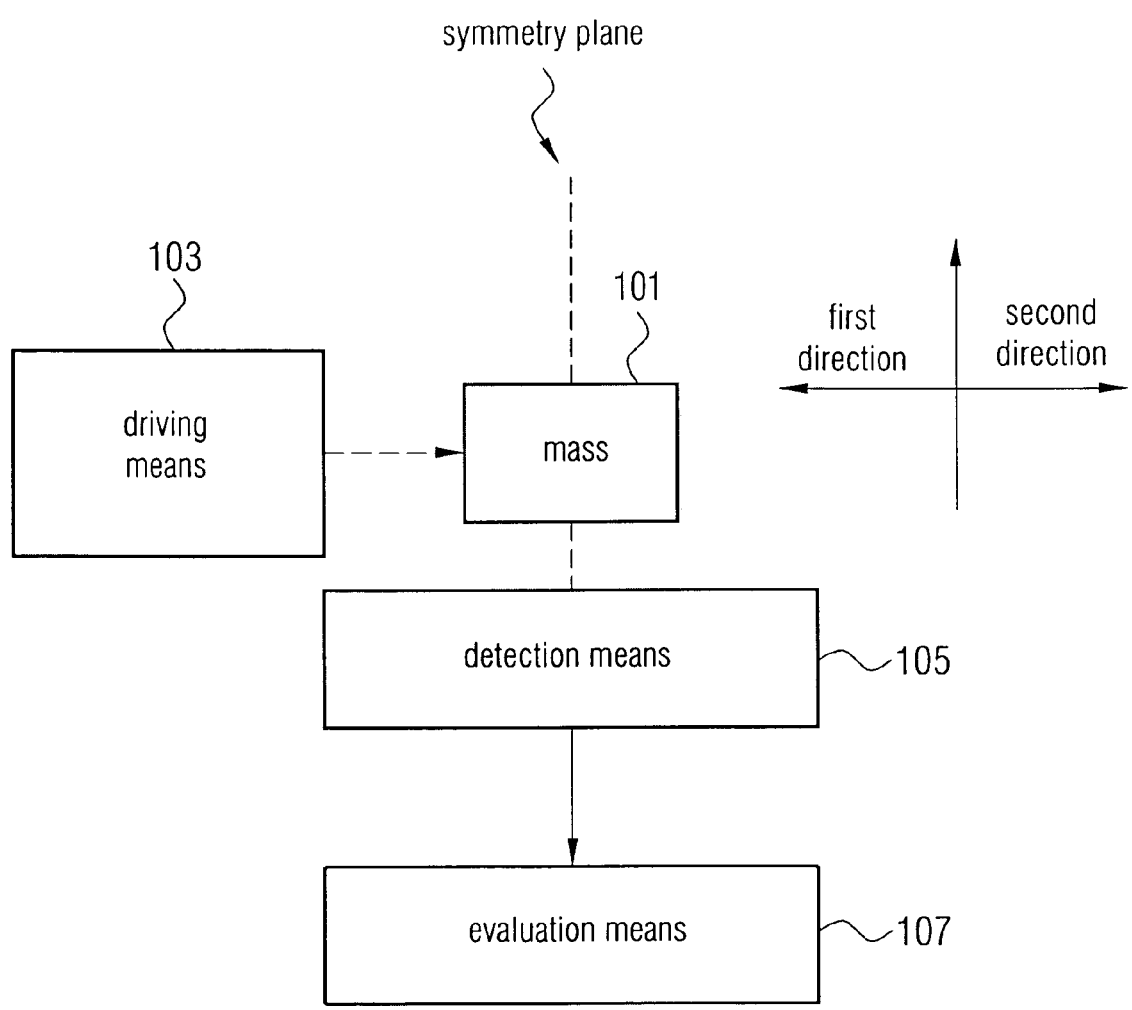
FIG. 1 is a first embodiment of an acceleration sensor according to the present invention.

FIG. 1 shows a first embodiment of an acceleration sensor according to the present invention. The acceleration has a mass 101, which can be deflected in a first and a second direction, wherein both directions are illustrated in a coordinate system plotted on the right next to the mass. The acceleration sensor illustrated in FIG. 1 has a driving means 103, which applies a variable force on the mass 101, as it is illustrated by the arrow in dotted lines. The acceleration sensor has a detection means 105, which can provide an output signal that can be received by the evaluation means 107.

In the following, the mode of operation of the acceleration sensor illustrated in FIG. 1 will be discussed.

If no force acts on the mass 101, i.e. if neither an accelerating force nor the variable force generated by the driving means acts on the mass 101, the mass remains in a resting position, which is indicated as vertical dotted symmetrical plane in the embodiment shown in FIG. 1. This resting position and this fixed point, respectively, is at the same time a reference point for the subsequent determination of the acceleration. If, however, the driving means is effective and the acceleration sensor is not subject to an accelerating force, the mass is set in motion due to the variable force in dependence on a force variation. If the driving means 103 drives the mass 101 with a periodic force, the movement of the mass 101 is periodical, so that it vibrates around the symmetrical plane with a vibration whose amplitude, phase and frequency are stable or can be kept constant, respectively. Thereby, a deflection direction of the mass 101 is dependent on the fact in which direction a vector of the periodical force currently points.

If, for example, the periodic force is sinusoidal, the mass 101 passes the symmetry plane each time when the force vector changes its direction. In other words, in that case, the mass 101 vibrates around the symmetry plane, so that its deflection in the first direction and in the second direction have an identical amplitude as well as an identical time period, so that the times when the mass 101 passes the predetermined position are identical. Since the mass 101 vibrates symmetrically around the symmetry plane (resting position), preferably, the time period of the respective deflection around the symmetry plane can be used as reference.

Preferably, the detection means 105 can be formed to detect the times when the mass passes a predetermined position, which is the symmetry plane in the embodiment shown in FIG. 1, when an acceleration is applied, so that the evaluation means 107 now determines a time difference between the detected times when the acceleration is applied and the times when the mass passes the predetermined position when no acceleration is applied, so that the acceleration is detected based on the time difference.

Preferably, the mass 101 is detected capacitively by the detection means. In that case, the mass 101 can influence, for example, a capacitance of a capacitor connected to the mass 101 during the movement, so that due to a capacitance variation the vibration can be detected when an acceleration is applied. According to the invention, the detection means can also operate inductively, wherein in that case the mass 101 is, for example, in a magnetic field. Above that, the detection means can operate piezoelectrically, piezoresistively, magnetoresistively (piezomagnetically) or also optically.

Further, according to the invention, the detection means 105 is formed to detect a deflection of the mass in a further direction which differs from the first and second directions. In that case, the evaluation means 107 can also detect an acceleration direction based on the deflection of the mass 101. According to the invention, two quantities, acceleration as well as acceleration direction, can be measured simultaneously. A detailed description of the inventive principle for determining the acceleration direction will be explained in more detail with regard to the embodiment illustrated in FIG. 7.

Figure 2:
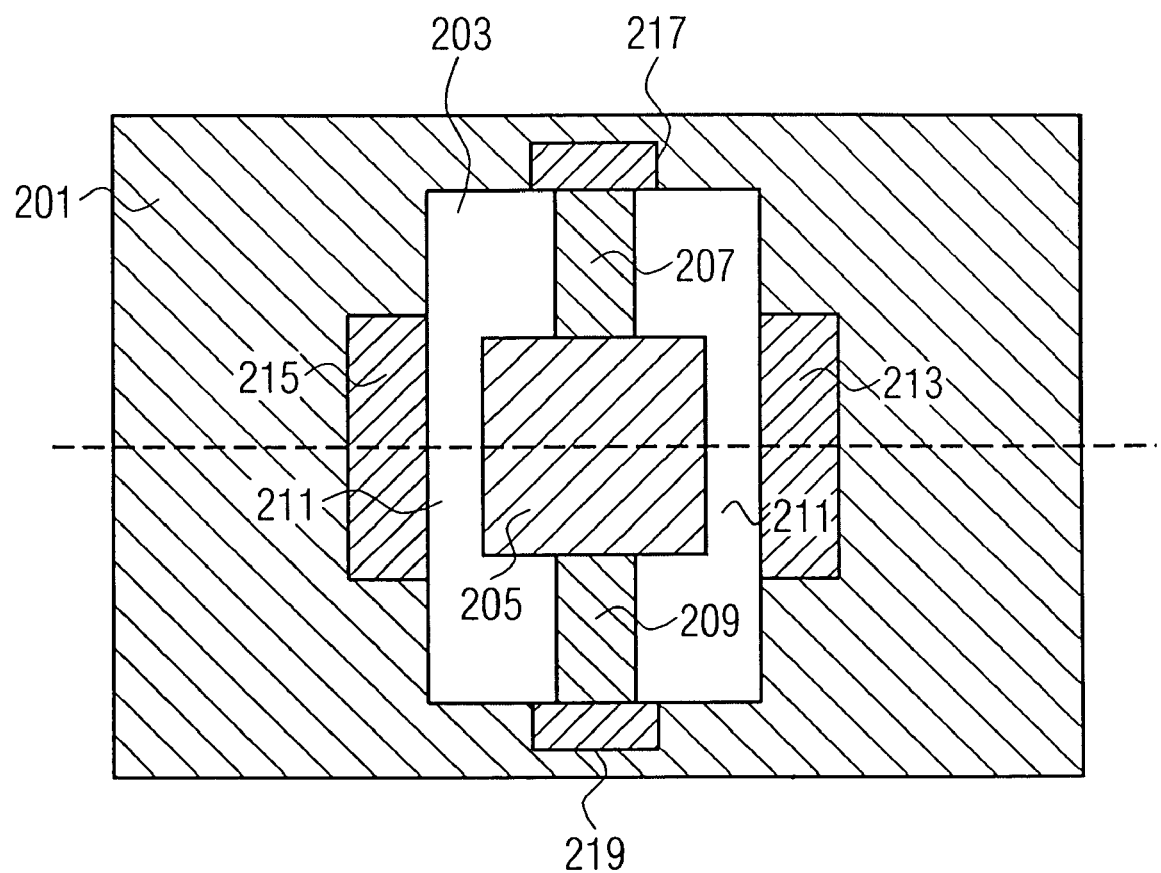
FIG. 2 is a further embodiment of an acceleration sensor according to the present invention.

FIG. 2 shows a further embodiment of an acceleration sensor according to the present invention. The acceleration sensor comprises, for example, a square fixture 201, which has a recess 203 in the center. Basically, the fixture can have any form. A mass 205 is disposed in the recess 203 and coupled to the fixture 201 via a first spring 207 and a second spring 209. Thereby, the mass 205 is coupled to a first end of the first spring 207 and to a first end of the second spring 209. A second end of the first spring 207 and a second end of the spring 209 are each connected to the fixture 201 via a decoupling isolation layer 217 and 219. Thereby, the two springs 207 and 209 are disposed such that their restoring force vectors are parallel. Thus, by arranging the mass 205, it can be freely deflected in the recess. The recess 203 has an electrode spacing 211 on each side between the mass and the fixture, so that the mass 205 does not touch the fixture. Further, the acceleration sensor has a first read-out electrode 213 and a second read-out electrode 215, wherein both read-out electrodes abut on the recess on the sides and are disposed such that they sandwich the mass 205. Further, the dotted horizontal line marks a sectional plane which will be discussed in FIG. 3.

In the following, the mode of operation of the embodiment shown in FIG. 2 will be discussed in detail. Thereby, for clarity purposes, the figures are not drawn to scale.

The mass 205 suspended above the springs is vibrated in a continuous translatory vibration (perpendicular to the drawing plane) by a driving means, which is not shown in FIG. 2 for clarity reasons, wherein a passing of a predetermined position is read out electronically. The predetermined position can, for example, be a resting position of the mass 205. The resting position means a position of the mass 205 with regard to a fixed point of the sensor when no acceleration is applied, as well as when the driving means is not active. If the mass is vibrated by the driving means, a time t1, which the mass needs to get from a resting position to a first turning point of the vibration and back to the resting position when no external acceleration is applied, and a time t2, which the mass 205 requires to get from its resting position to its second turning point of the vibration and back to the resting position, are identical. The passing of the resting position is read out electronically by the first read-out electrode 213 and by the second read-out electrode 215. Each time when the resting position is passed, for example, a voltage pulse is generated, wherein a time curve of these pulses will be referred to as "resting signal" below. With regard to the voltage pulses, the resting signal consists of equidistant pulses with the distance t1=t2 for the case of the sufficiently small pulses, when no external acceleration is applied.

If an external acceleration is applied in the direction of the vibration of the mass 205, the symmetry plane of the vibration shifts with regard to the fixed point. Thus, the times t1 and t2 become different, so that the resting signal does no longer consist of equidistantly distributed pulses. Thus, the acceleration can be concluded from the difference t1−t2. In order to avoid an influence of drifting of a vibration frequency of the vibration of the mass 205 during determining the acceleration, preferably, a relative variation (t1−t2)/(t1+t2) can be used for determining the acceleration.

In the top view of a spring-mass system with fixture 201 schematically shown in FIG. 2, all elements can be made, for example, of conductive material, e.g. highly doped silicon. As has already been discussed, the mass 205 is suspended via two springs 207 and 209, wherein the spring-mass system is electrically insulated from the fixture 201 by the appropriate insulation structure 217 and 219. Above that, the mass 205 is also isolated from the read-out electrodes 213 and 215 by the electrode spacing 211, so that it can freely vibrate in the recess 203.

Due to the arrangement of the first and second springs 207 and 209, the respective spring restoring forces are parallel. Further, the mass 205 is disposed such between the two springs, that it is vibrated perpendicular to the drawing plane, as has already been discussed. If the mass 205 is subject to an acceleration force, which is also perpendicular to the drawing plane, the electrodes 213 and 215, as has already been discussed, can detect the times where the mass passes the predetermined position, which does not necessarily have to be the resting position but can also be a different position, when an acceleration is applied. An evaluation means not shown in FIG. 2 for clarity reasons can thus determine the acceleration, as has already been discussed with regard to the embodiment shown in FIG. 1.

Figure 3:
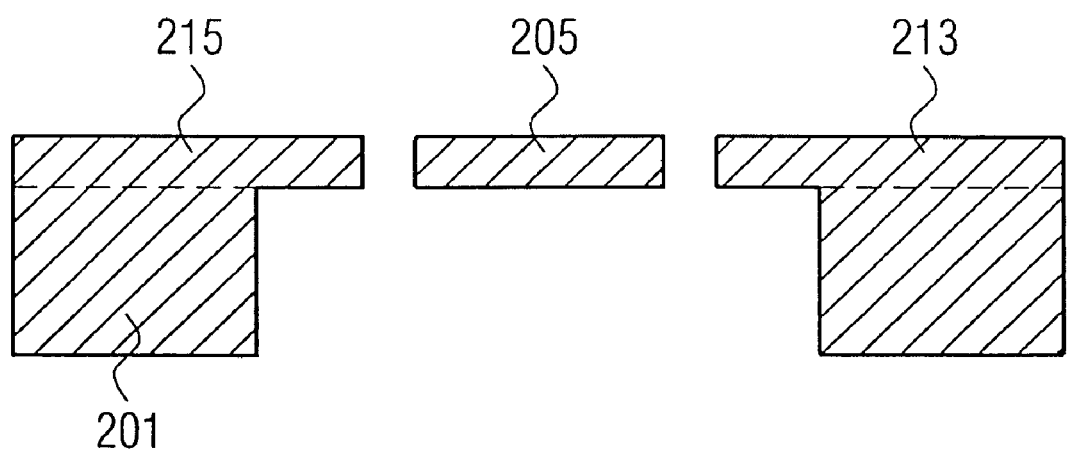
FIG. 3 is a cross section of the acceleration sensor illustrated in FIG. 2.

FIG. 3 shows a cross section illustration of the embodiment shown in FIG. 2 along the dotted line. Based on FIG. 3, it becomes clear that the mass vibrates past the read-out electrodes 213 and 215 during a vibration. If the mass is not subject to an acceleration force, a deflection of the mass in a first direction, for example towards the top, and in a second direction, for example towards the bottom, is identical. Thus, during vibration of the mass while no acceleration is applied, a capacitance changes, which is formed by the mass 205 as well as the read-out electrodes 213 and 215, changes periodically, such that a capacitance maximum occurs when the mass passes the resting position, i.e. when the mass vibrates past the read-out electrodes 215 and 213. During external acceleration, the mass is deflected differently in both directions, so that the capacitance maxima are no longer distributed equidistantly, since the mass does no longer vibrate symmetrically around the resting position.

FIGS. 4A and 4B show a capacitance signal as well as an associated resting position signal when no external acceleration is applied.

In FIG. 4A, an evaluation of a signal is illustrated schematically during vibration when no acceleration is applied. Thereby, the ordinate shows a capacitance scaling relative to an arbitrary unit, and on the abscissa, the time is plotted relative to an arbitrary unit. As can be clearly seen in FIG. 4A, capacitance maxima, which are periodical and above that distributed in an equidistant way, occur when no acceleration is applied.

In FIG. 4B, a time curve of a resting signal is illustrated. These are, for example, narrow voltage pulses, which are generated when the capacitance signal illustrated in FIG. 4A reaches a maximum. The resting signal is also distributed periodically and in an equidistant way, since it characterizes the capacitance signal of FIG. 4A. A read-out electronic disposed in an evaluation means can calculate the acceleration from a time sequence of the voltage pulses shown in FIG. 4B. If the voltage pulses shown in FIG. 4B are distributed periodically and in an equidistant way, this provides an indication that no external acceleration acts on the mass.

If an external acceleration is applied, the signal curves illustrated exemplarily in FIG. 5 will result.

FIG. 5A shows a time curve of the capacitance signal when an external acceleration acts on the mass. It can clearly be seen that the capacitance maxima are no longer distributed in an equidistant way. This happens due to the fact that the mass 205, as shown in FIG. 3, is influenced by an acceleration force, which is assumed to be constant, during external acceleration, so that it is, for example, deflected towards the bottom in relation to the resting position. When an acceleration is applied, the mass 205 passes the two read-out electrodes 213 and 215 no longer at equidistant times in the resulting vibration, so that the curve illustrated in FIG. 5A results.

The associated resting signal is illustrated in FIG. 5B. These are voltage pulses, which are generated when the mass 205 passes the read-out electrodes 215 and 213, which is equal to a temporal occurrence of the capacitance maxima. It can be clearly seen that the voltage pulses are no longer distributed in an equidistant way, so that, for example, a time distance between the second and the first voltage pulse is lower than a time distance between the second and the third voltage pulse. From the resulting time difference, particularly with regard to the wave forms illustrated in FIG. 4, the acceleration can be detected by an evaluation means.

Here, it should be noted that both the wave forms illustrated in FIG. 4 and in FIG. 5 are periodical with a fixed period. This is due to the fact that in the previously discussed embodiments, the acceleration is always assumed to be constant, which can be equated with a constant accelerating force. However, the inventive sensor can also be used for determining the current acceleration, when the acceleration force is not constant. In that case, the resting signal illustrated in FIG. 5B would no longer be periodical, but non-periodical. According to the invention, the current acceleration can also be detected, for example, from a time difference resulting in relation to the capacitance maximum in relation to the capacitance maxima occurring during the vibration when no acceleration is applied.

Figure 6:
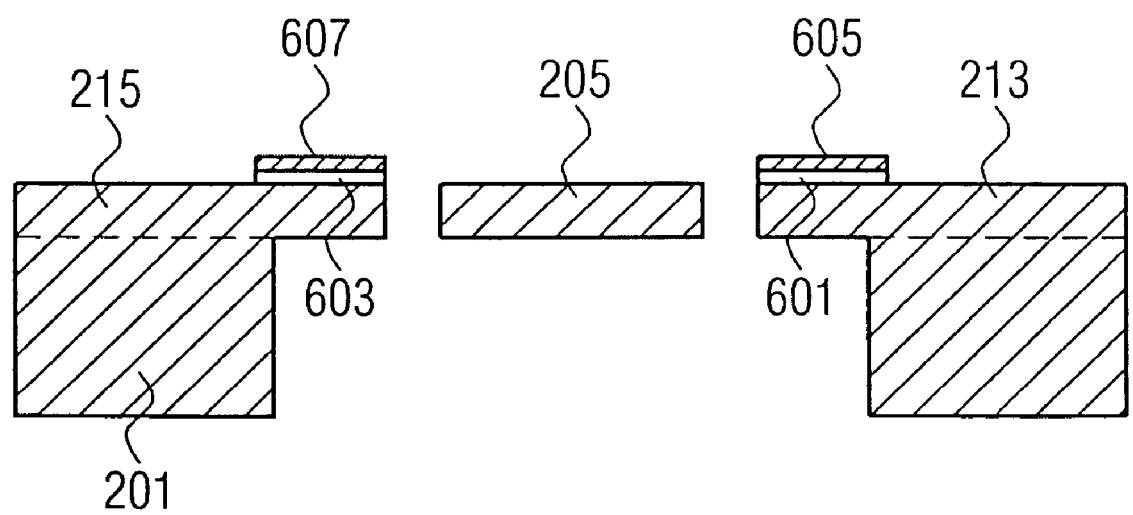
FIG. 6 is a further embodiment of an acceleration sensor according to the present invention.

A further embodiment of an inventive acceleration sensor is shown in FIG. 6, wherein its cross section is shown in the figure.

In contrast to the embodiment shown in FIGS. 2 and 3, a third read-out electrode 601 is disposed on the first read-out electrode 213. Further, a fourth read-out electrode 603 is disposed on the second read-out electrode 215. A third insulation layer 605 is disposed on the third read-out electrode 601 such that a surface of the third read-out electrode 601 is covered by the same. Analogously, a fourth insulation layer 607 is disposed on the fourth read-out electrode 603, which covers a surface of the fourth read-out electrode 603.

Below, the mode of operation of the embodiment shown in FIG. 6 will be discussed in more detail.

The embodiment shown in FIG. 6 corresponds merely to the embodiment illustrated in FIGS. 2 and 3, wherein the acceleration sensor has now an additional electrode structure, consisting of the third and the fourth read-out electrode 601 and 603. According to the invention, the additional electrode structure is used for determining the acceleration direction. Thereby, the additional electrodes 601 and 603 can be contacted separately from the read-out electrodes 213 and 215. By determining, for example, a capacitance between the additional electrodes 601 and 603 as well as the mass 205, a shift of a vibration symmetry plane is provided, wherefrom an acceleration direction can be determined by an evaluation means not shown in FIG. 6. Therefore, no absolute capacitance has to be determined between the additional electrodes 601 and 603 as well as the mass 205, but, for example, a time of a capacitance maximum, which is formed by the additional electrodes 601 and 603 as well as mass 205. An evaluation means, which is not shown in FIG. 6 for clarity reasons, can detect the acceleration based on the times, as has already been discussed. The arrangement of the electrodes 601 and 603 is merely shown exemplarily. Basically, these electrodes can also be positioned in a different way.

Figure 7:
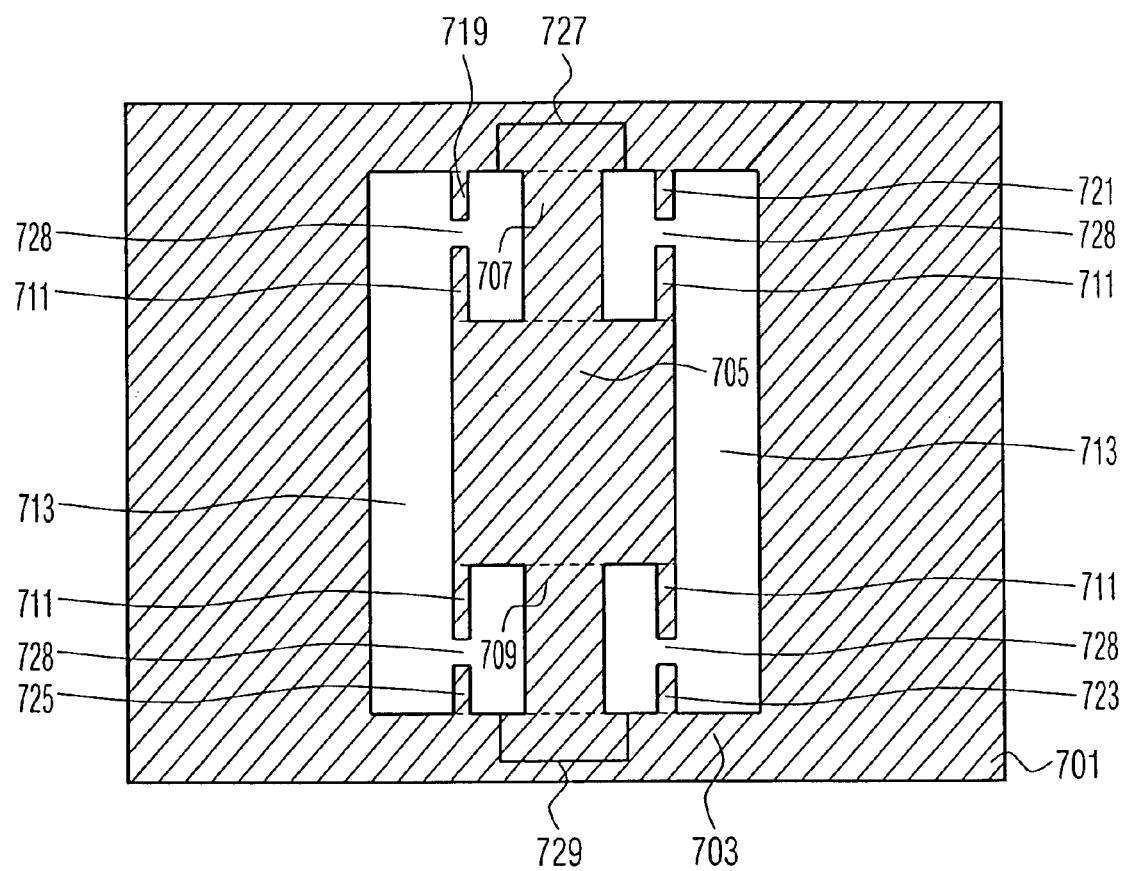
FIG. 7 is a further embodiment of an acceleration sensor according to the present invention.

FIG. 7 shows a further embodiment of an acceleration sensor according to the present invention.

The acceleration sensor illustrated in FIG. 7 has a square fixture 701, in the center of which is a recess 703. A mass 705 is suspended in the recess 703 between a first spring 707 and a second spring 709. The mass 705 has a substantially square cross section. At the edges, further regions 711 exist, which have an narrow square cross section and which extend the mass 705 at the edges both towards the top and towards the bottom. On the sides between the mass 705 and the fixture 701, the acceleration sensor shown in FIG. 7 has an electrode spacing 713. The fixture 701 is described as square merely exemplarily and can basically have any form.

In contrast to the acceleration sensor illustrated in FIG. 2, the acceleration sensor illustrated in FIG. 7 further has a third read-out electrode 719, a fourth read-out electrode 721, a fifth read-out electrode 723 as well as a sixth read-out electrode 725. The read-out electrodes 719 to 725 are disposed at the top and the bottom in the fixture 701, respectively, and extend into the recess 703 such that they are disposed opposite to the respective further region 711 of the mass 705. The read-out electrodes 719 to 725 have a narrow square cross section, whose dimension can be compared to the dimension of the squares of the further regions 711. Further electrodes spacings 728 are disposed between the respective read-out electrodes 719–725 and the respective further region 711. The first spring 707 is connected to the fixture 701 via a first insulation layer 727, however, the second spring 709 is connected to the fixture 709 via a second insulation layer 729.

In the following, the mode of operation of the acceleration sensor illustrated in FIG. 7 will be discussed in more detail.

In the embodiment illustrated in FIG. 7, the mass 705 is vibrated by a driving apparatus not shown in the Fig. for clarity reasons. In that case, a vibration is excited, which runs from left to right and vice versa in FIG. 7, i.e. the mass vibrates in the drawing plane when no external acceleration is applied. Thus, the respective further region 711 of the mass 705 passes the respective read-out electrodes 719–725. If for example, a resting position of the mass 705, where the further regions 711 are opposed at the read-out electrodes 719–725, is chosen as a predetermined position for determining the acceleration, the mass is deflected symmetrically around the resting position during vibration when no acceleration is applied. Thereby, the mass 705 and its further regions 711, respectively, do not touch the respective electrodes 719 to 725, since there are electrode spacings 728 in between.

Thus, the mass 705 is isolated from the read-out electrodes 719–725 by the respective electrode spacing 728.

A capacitance, which occurs due to the mass 705 and the read-out electrodes 719–725, changes during vibration of the mass such that a capacitance maximum occurs when the mass 705 passes the resting position. Thereby, the capacitance maxima always occur equidistantly distributed and periodically when no external acceleration is applied, so that the determination of the acceleration as well as an evaluation method can be performed analogously, as is already the case in connection with the embodiment discussed in FIG. 5.

During acceleration, the mass 705 does no longer vibrate symmetrically around the resting position, so that, for example, a deflection of the mass towards the left is not as strong as a deflection of the mass towards the right. This means that the times when the mass 705 passes the resting position are not distributed in an equidistant way. Therefrom, an evaluation means not shown in FIG. 7 can determine the acceleration. Thereby, the evaluation means can be preferably formed to capacitively detect lateral vibrations.

Apart from determining the acceleration, the acceleration sensor shown in FIG. 7 can also be used, similar to FIG. 2, for determining an acceleration direction.

Thus, a field of application of the inventive acceleration sensor comprises all fields where a positive or a negative acceleration of a body, object or sensor itself is detected with the help of a sensor. This can, for example, be an acceleration by pulses, for example as caused by an impact, or an oscillating acceleration, such as caused by a vibration. Further, accelerations which occur due to a rotational movement can be detected.

Figure 8:
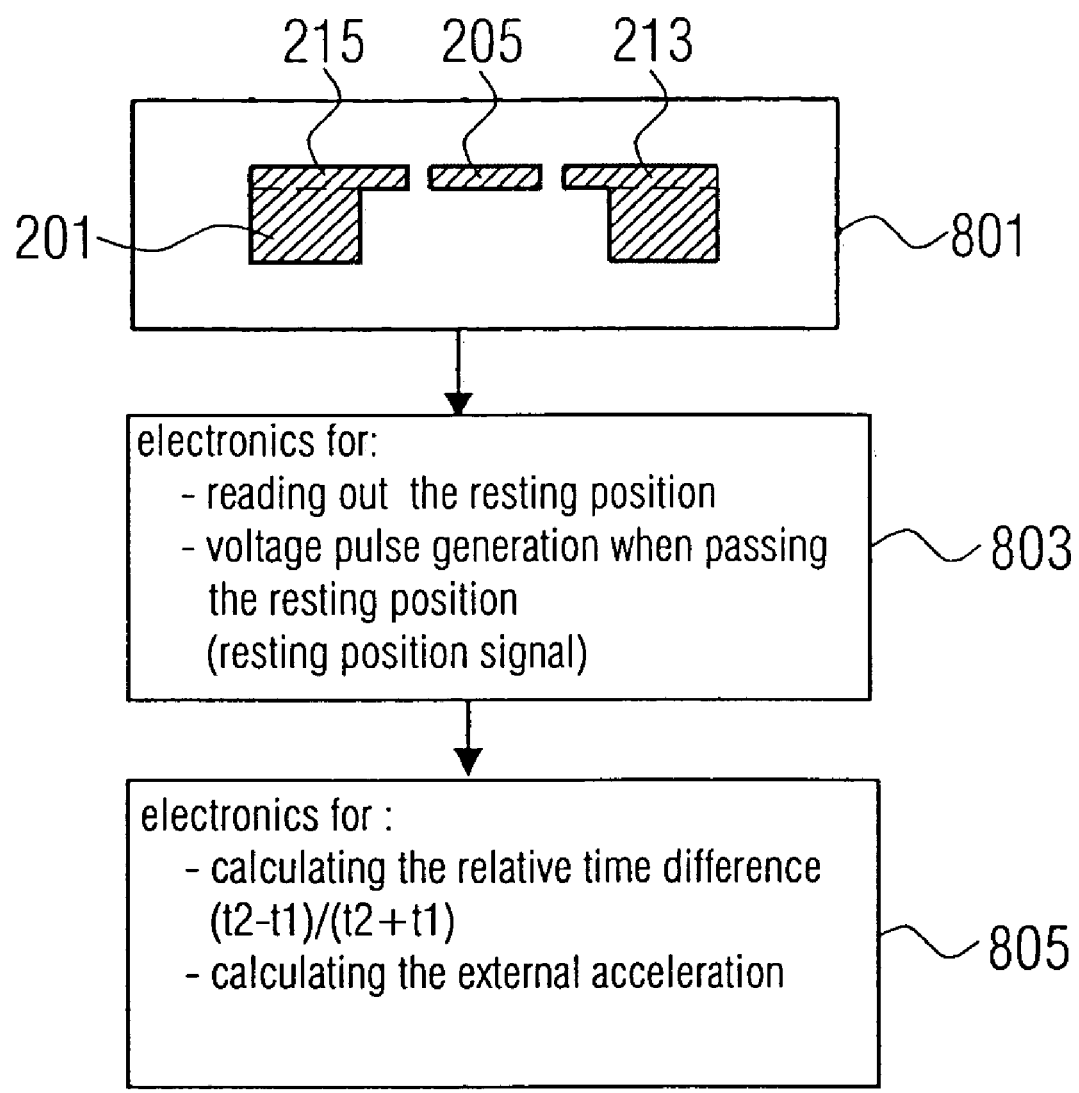
FIG. 8 is an embodiment of a method for determining an acceleration.

An embodiment of an inventive method for determining the acceleration is illustrated in FIG. 8, which basically illustrates the steps performed when determining the acceleration.

Starting from a dynamic system 801, which has, for example, the acceleration sensor illustrated in FIG. 3, a vibration of the mass 205 is detected by a detection means 803. The detection means 803 comprises electronics for reading out a resting position, for generating voltage pulses when passing the resting signal, so that a downstream evaluation means 805 can perform the calculation of the external acceleration. Thereby, for example a relative time difference is calculated, which is used for determining the external acceleration.

As illustrated in FIG. 8, in the inventive method, preferably those times are detected when the mass passes a predetermined position (resting position) during vibration when an acceleration is applied, and a time difference is determined between the detected times during the vibration when an acceleration is applied and times when the mass passes the predetermined position when no acceleration is applied. Based on the time difference, the acceleration can be detected in the evaluation means.

In all discussed embodiments, the case was considered where a voltage amplitude can be detected via a pulse width of the capacitance signal. The width of the capacitance signal can, for example, be determined based on the curve illustrated in FIG. 4A, where, for example, an appropriate threshold is predetermined. This determined width is indirectly proportional to the vibration amplitude for large vibration amplitudes or high thresholds with very good approximation. The vibration amplitude can either be kept constant with the help of a regulator, or the determined width of the capacitance signal is directly used for determining the acceleration.

According to a further embodiment, the inventive approach describes a system for capacitively detecting an acceleration, which, compared to conventional approaches, only needs a simple read-out circuit and in particular, is not influenced by temperature variations or drifts of the amplifier elements, as has already been mentioned.

Passing the resting position (or a position with a fixed distance to the resting position) can thereby preferably be detected by detecting a capacitance maximum. Alternatively, the capacitance signal present as voltage can, for example, be compared to a fixed reference value with the help of a comparator, wherein drifting of a reference voltage or of the capacitance signal does not enter the determination of the acceleration, as long as merely the relative time difference $(t2-t1)/(t2+t1)$ is used. The times $t1$ and $t2$ and all subsequent times can, for example, be set by a rising edge of the pulse.

According to a further embodiment, the inventive micromechanical device comprises a spring-mass system, wherein the mass is vibrated for acceleration detection, an apparatus for reading out the passing of the resting position by the mass and a position, respectively, which is in a fixed distance to the resting position, wherein the resting position is seen as the position of the mass which the mass takes up in its resting state when no external acceleration is applied, as well as an apparatus for maintaining a constant vibration amplitude (driving means) or for reading out an amplitude related signal.

Thus, the invention relates to a micromechanically produced spring-mass system and particularly an embodiment of the spring-mass system influenced by external acceleration, as well as a method for determining the external acceleration. The spring-mass system receiving the acceleration is thereby preferably formed such that the determination of the acceleration by a read-out circuit can be kept very simple and above that is not influenced by temperature variations or by drift of electronical amplifier elements or other electronical devices required for readout.

The field of application of the inventive acceleration sensor comprises all areas where a positive or negative acceleration of a body, object or the sensor itself is detected with the help of a sensor. This can be an acceleration by pulses, such as, for example, caused by an impact, or also an oscillating acceleration, as, for example, caused by a vibration. Further, preferably, accelerations occurring due to a rotational motion can be detected.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An acceleration sensor, comprising:
   a mass, which is deflectable in a first direction and a second direction opposite to the first direction;
   a driver, which is effective to vibrate the mass;
   a detector for detecting times when the mass passes a predetermined position when an acceleration is applied;
   an evaluator, which detects the acceleration based on the detected times during acceleration and times when the mass passes the predetermined position when no acceleration is applied.

2. The acceleration sensor according to claim 1, wherein the evaluator is formed to determine a time difference between the detected times during acceleration and the times when the mass passes the predetermined position when no acceleration is applied, and to detect the acceleration based on the time difference.

3. The acceleration sensor according to claim 1, wherein the detector is formed to detect the vibration capacitively, inductively, piezoelectrically, piezoresistively, magnetoresistively or optically.

4. The acceleration sensor according to claim 1, wherein the mass is deflectable in a further direction which differs from the first and second directions, wherein the detector is further formed to detect a deflection of the mass in the further direction;
   wherein the evaluator is formed to detect an acceleration direction based on the deflection of the mass in the further direction.

5. The acceleration sensor according to claim 4, wherein the evaluator is formed to capacitively detect lateral vibrations.

6. The acceleration sensor according to claim 1, wherein the mass is coupled to a first and a second spring.

7. A method for detecting an acceleration based on a vibrating mass, comprising the steps of:
   vibrating the mass;
   detecting times when the mass passes a predetermined position when an acceleration is applied;
   detecting the acceleration based on the detected times during acceleration and times when the mass passes the predetermined position when no acceleration is applied.

8. The method according to claim 7, comprising the steps of:
   determining a time difference between the detected times during acceleration and the times when the mass passes the predetermined position when no acceleration is applied;
   detecting the acceleration based on the time difference.

* * * * *